(12) United States Patent
Fremerey

(10) Patent No.: US 7,872,553 B2
(45) Date of Patent: Jan. 18, 2011

(54) MAGNETIC BEARING ELEMENT

(75) Inventor: Johan K. Fremerey, Bonn (DE)

(73) Assignee: Forschungszentrum Julich GmbH, Julich (DE)

(*) Notice: Subject to any disclaimer, the term of this patent is extended or adjusted under 35 U.S.C. 154(b) by 56 days.

(21) Appl. No.: 10/565,203

(22) PCT Filed: Jun. 30, 2004

(86) PCT No.: PCT/EP2004/007054

§ 371 (c)(1),
(2), (4) Date: May 22, 2006

(87) PCT Pub. No.: WO2005/019670

PCT Pub. Date: Mar. 3, 2005

(65) Prior Publication Data
US 2007/0090907 A1 Apr. 26, 2007

(30) Foreign Application Priority Data
Jul. 23, 2003 (DE) .............................. 103 33 733

(51) Int. Cl.
H01F 7/02 (2006.01)
H01F 3/00 (2006.01)
H01F 1/00 (2006.01)
H01F 7/00 (2006.01)
H02K 7/09 (2006.01)

(52) U.S. Cl. .................... 335/302; 335/296; 335/303; 335/306; 310/90.5

(58) Field of Classification Search ................ 335/296, 335/302–306
See application file for complete search history.

(56) References Cited

U.S. PATENT DOCUMENTS

| 2,591,921 | A | * | 4/1952 | Cosgriff et al. .......... 73/514.07 |
| 2,704,231 | A | * | 3/1955 | Goldsmith ................. 310/90.5 |
| 2,747,944 | A | * | 5/1956 | Baermann ................. 310/90.5 |
| 3,585,549 | A | * | 6/1971 | Muller ....................... 335/284 |
| 3,909,082 | A | * | 9/1975 | Ishikawa et al. ........... 310/90.5 |
| 4,004,167 | A | * | 1/1977 | Meckling ............... 310/154.25 |
| 4,483,570 | A | * | 11/1984 | Inoue ........................ 310/90.5 |
| 4,668,885 | A |   | 5/1987 | Scheller |
| 4,835,505 | A | * | 5/1989 | Hattori et al. ............... 335/302 |
| 5,126,610 | A |   | 6/1992 | Fremerey |
| 5,302,874 | A | * | 4/1994 | Pinkerton ................. 310/90.5 |

(Continued)

FOREIGN PATENT DOCUMENTS

DE    32 49 423 A1    4/1984

(Continued)

OTHER PUBLICATIONS

Patent Abstracts of Japan—Journal Bearing Device. App No. 59107418 Filed May 29, 1984 Inventor: Suwa Yoshihide Applicant: Toshiba Corp.

(Continued)

*Primary Examiner*—Anh T Mai
*Assistant Examiner*—Mohamad A Musleh
(74) *Attorney, Agent, or Firm*—Berenato & White, LLC

(57) ABSTRACT

The invention relates to a magnetic bearing element having at least one annular permanent magnet (2, 3) that is surrounded by an annular binding band (5), which element is characterized in that the permanent magnet (2, 3) is divided at least one location (4) and spaced apart there.

12 Claims, 1 Drawing Sheet

U.S. PATENT DOCUMENTS

| | | | | |
|---|---|---|---|---|
| 5,471,105 A * | 11/1995 | Clifton et al. | ............... | 310/90.5 |
| 5,506,558 A * | 4/1996 | Laube | ........................ | 335/306 |
| 5,508,573 A * | 4/1996 | Andrews et al. | ........... | 310/90.5 |
| 5,525,849 A * | 6/1996 | Ito et al. | .................... | 310/90.5 |
| 5,710,469 A * | 1/1998 | Ries | ......................... | 310/90.5 |
| 5,986,373 A * | 11/1999 | Stucker | .................... | 310/90.5 |
| 6,118,199 A * | 9/2000 | Lembke | .................... | 310/90.5 |
| 6,250,577 B1 * | 6/2001 | Koenig | ...................... | 241/239 |
| 6,369,476 B1 * | 4/2002 | Sung et al. | ................. | 310/90.5 |
| 6,466,119 B1 * | 10/2002 | Drew | ........................ | 335/306 |
| 6,541,885 B2 * | 4/2003 | Canders et al. | ............. | 310/90.5 |
| 6,770,995 B1 * | 8/2004 | Foshage | ................... | 310/90.5 |
| 6,828,890 B2 * | 12/2004 | Cope et al. | ................. | 335/296 |
| 6,850,140 B1 * | 2/2005 | Gleckner | ................... | 335/306 |
| 2002/0190828 A1 * | 12/2002 | Lee et al. | .................... | 335/302 |
| 2003/0076206 A1 * | 4/2003 | Lee et al. | .................... | 335/302 |

FOREIGN PATENT DOCUMENTS

| | | |
|---|---|---|
| DE | 38 08 331 C2 | 9/1989 |
| DE | 3215696.7 | 4/1994 |
| EP | 0 728 956 A1 | 8/1996 |
| WO | PCT/US96/13927 | 3/1997 |

OTHER PUBLICATIONS

Patent Abstracts of Japan—Superconducting Magnetic Bearing Device. App No. 07010051 Filed Jan. 25, 1995 Inventor: Hiromasa Fukuyama Applicant: Nippon Seiko.

Patent Abstracts of Japan—Thrust Bearing of Superconducting Flywheel Device. App 10081084 Filed Mar. 27, 1998 Inventor: Nagay Shigeo Applicant: Chubu Electric.

* cited by examiner

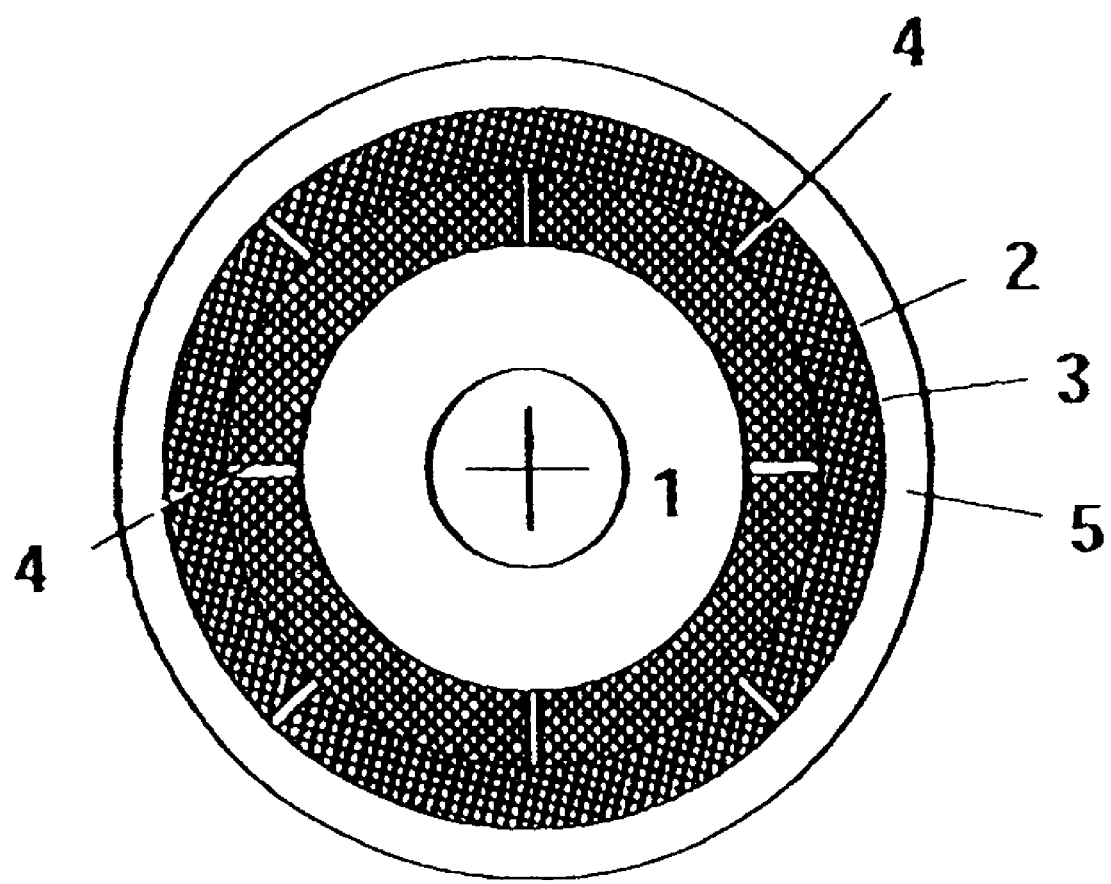

MAGNETIC BEARING ELEMENT

CROSS-REFERENCE TO RELATED APPLICATIONS

The present invention is a U.S. national stage entry of international application number PCT/EP2004/007054 filed on Jun. 30, 2004, which claims priority from German patent application number 103 33 733.4-51 filed on Jul. 23, 2003, the contents of which are incorporated herein by reference and to which priority is claimed.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

1. Field of the Invention

The invention relates to a magnetic bearing element having at least one annular permanent magnet that is surrounded by an annular binding band.

2. Description of Related Art

Magnetic bearing elements of this kind for magnetic bearing arrangements are known. The document DE 38 08 331 C2 discloses a magnetic bearing that comprises two self-contained bearing components: a stabilization bearing and a center-of-gravity bearing. This non-contact bearing system is implemented using annular permanent magnets and at least one further set of magnet rings that have an axial magnetization opposite to that of the first set. Such bearing arrangements are used predominantly in machines that are operated at very high rotation speeds, for example turbomolecular pumps or flywheels.

To prevent the annular permanent magnets of the stabilization bearing from expanding, as a result of the large centrifugal forces occurring at high rotation speeds, to such an extent that the fits existing between the magnets become lost and the magnets burst (or shift in the axial direction and detach from the hub), concentric binding bands made of high-strength non-magnetic material having a high tensile strength, preferably a carbon-fiber material with a high tangential preload, are mounted from outside onto the annular permanent magnets during assembly of the bearing elements. These binding bands exert large, inwardly directed radial forces on the annular permanent magnets, counteracting the centrifugal forces that occur during operation.

A substantial disadvantage is the fact that much of the binding band preload is required simply to close the radial gaps between the concentric magnets, and between the inner magnets and the rotor hub. The extremely large centrifugal forces occurring at very high rotation speed can cause the permissible tensile stresses in the binding band, and the permissible compressive stress in the magnet material, to be exceeded. The consequence is that either the binding bands or the annular permanent magnets are destroyed.

BRIEF SUMMARY OF THE INVENTION

It is therefore the object of the invention to make available a magnetic bearing element that requires a lower preloading of the binding bands in order to close the gaps between the permanent magnets.

This object is achieved, according to the present invention, in that the respective permanent magnet is divided at least one location and spaced apart there. The division may be formed by a radially extending slit which is defined by opposing faces of the magnet which are spaced apart, i.e., not in contact with each other. The tangential supporting force occurring in an undivided permanent magnet is eliminated by this division. The divided permanent magnet can, as a result, be impinged upon by the binding band with a substantially lower pressure in order to overcome the gaps. The consequence is either that substantially larger centrifugal forces can act on the permanent magnets without causing the latter to expand and detach from the hub or to shift axially, or that the preload can be made smaller, thus reducing the risk of destruction of the binding band or the magnet.

The necessary binding band preload can be made even smaller if the permanent magnet is divided and spaced apart at multiple locations. The division can also be embodied as a radially extending slit.

If the division locations are distributed regularly over the periphery of the permanent magnet, a homogeneous distribution of the force acting on the permanent magnets as a result of the binding band preload is achieved. Impermissible bending stresses in the magnet rings are also avoided.

In a manner known per se, the bearing element can comprise multiple permanent magnets arranged concentrically with one another, all of which are divided at least one location and spaced apart there. Here as well, the tangential supporting force that occurs in permanent magnets embodied without a slit is eliminated. The binding band preload needed to produce an immovable compressive contact between the enveloping surfaces of the individual permanent magnets can, as a result, be made smaller.

When multiple permanent magnets arranged concentrically with one another are provided, the locations at which the permanent magnets are divided are advantageously offset from one another in the circumferential direction. The result is that bearing stability is further enhanced, the force acting on the magnets as a result of the preload is homogeneously distributed, and assembly is simplified.

Advantageous embodiments of the invention are disclosed in the dependent claims and in the description below of the drawings.

BRIEF DESCRIPTION OF THE DRAWING

FIG. 1 illustrates a cross section of a magnetic bearing element according to an embodiment of the present invention.

DETAILED DESCRIPTION OF THE INVENTION

The invention is illustrated in more detail, with reference to an exemplifying embodiment, in the FIGURE, which is a cross section through the magnetic bearing element according to the present invention. A hub 1 is surrounded by an annular magnet 2 that comprises radially extending slits 4 offset 90 degrees from one another. The slits 4 divide the annular magnet 2 into a plurality of spaced apart segments that are not in contact with adjacent segments. Adjoining this annular magnet 2, which is split into four segments, is a further annular magnet 3. The latter is likewise split into four segments by four radially extending slits 4 offset 90 degrees from one another. Slits 4 of annular magnet 3 are arranged with an offset of 45 degrees from slits 4 of annular magnet 2. A binding band 5 is mounted onto annular magnets 2, 3 and hub 1 with a preload, ensuring that annular magnets 2, 3, as well as annular magnet 2 and hub 1, are in contact against one another with an inwardly directed force.

The invention claimed is:

1. A magnetic bearing element, comprising:

A plurality of annular permanent magnets arranged concentrically with one another, each annular permanent magnet is divided in a circumferential direction thereof at least one location forming radially extending slits and segments, the radially extending slits defined by opposing faces of the segments, wherein the opposing faces of each segment are not in contact with the adjacent segment, and wherein the radially extending slit of one of the annular multiple permanent magnets is angularly offset from the radially extending slit of another one of the annular multiple permanent magnets in the circumferential direction, and an annular binding band surrounding and engaged with the outer one of the annular permanent magnets, and exerting a preloading force on said plurality of annular magnets.

2. The magnetic bearing element according to claim 1, wherein the permanent magnet is divided in a circumferential direction thereof at multiple locations to form multiple radially extending slits and a plurality of space apart segments and the plurality of spaced apart segments are not in contact with adjacent segments.

3. The magnetic bearing element according to claim 2, wherein the locations are distributed regularly around a periphery of the permanent magnet.

4. The magnetic bearing element according to claim 1, wherein the bearing element comprises multiple permanent magnets arranged concentrically with one another, all of which are divided at multiple locations and spaced apart there.

5. The magnetic bearing element according to claim 4, wherein the radially extending slit of one of the multiple permanent magnets is offset from the radially extending slot of another one of the multiple permanent magnets in the circumferential direction.

6. The magnetic bearing element according to claim 1, wherein the annular band is made from carbon-fiber material.

7. A magnetic bearing element comprising:

a hub;

an annular permanent magnet mounted on said hub and divided in a circumferential direction in at least one location to form segments and a radially extending slit defined by opposing faces of the divided segments of the magnet; and an annular binding band surrounding and engaged with said annular magnet, said annular binding band exerting an inwardly directed radial force preloading said annular magnet, wherein the opposing faces of adjacent segments are not in contact with each other, wherein multiple annular permanent magnets are arranged concentrically with one another, all of which are divided at least one location and spaced apart there, and wherein the radially extending slit of one of the annular multiple magnets is angularly offset from the slit of another one of the annular magnets in the circumferential direction.

8. The magnetic bearing element according to claim 7, wherein the permanent magnet is divided in a circumferential direction thereof at multiple locations to form multiple radially extending slits and a plurality of space apart segments and the plurality of spaced apart segments are not in contact with adjacent segments.

9. The magnetic bearing element according to claim 8, wherein the locations are distributed regularly around a periphery of the permanent magnet.

10. The magnetic bearing element according to claim 8, wherein the bearing element comprises multiple permanent magnets arranged concentrically with one another, all of which are divided at least one location and spaced apart there.

11. The magnetic bearing element according to claim 10, wherein the radially extending slit of one of the multiple permanent magnets is offset from the radially extending slot of another one of the multiple permanent magnets in the circumferential direction.

12. The magnetic bearing element according to claim 8, wherein the annular band is made from carbon-fiber material.

* * * * *